United States Patent
Miura et al.

(10) Patent No.: US 9,060,150 B2
(45) Date of Patent: Jun. 16, 2015

(54) IMAGE READING APPARATUS AND SHEET PROCESSING APPARATUS

(71) Applicant: Kabushiki Kaisha Toshiba, Tokyo (JP)

(72) Inventors: Junji Miura, Kanagawa-ken (JP); Seiji Ikari, Kanagawa-ken (JP); Tomonori Makino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/020,112

(22) Filed: Sep. 6, 2013

(65) Prior Publication Data

US 2014/0168719 A1 Jun. 19, 2014

(30) Foreign Application Priority Data

Sep. 19, 2012 (JP) .................. 2012-206218

(51) Int. Cl.
- G06K 9/74 (2006.01)
- H04N 1/401 (2006.01)
- G07D 7/12 (2006.01)
- G07D 7/16 (2006.01)
- G07D 7/18 (2006.01)
- H04N 1/028 (2006.01)

(52) U.S. Cl.
CPC ............ *H04N 1/401* (2013.01); *G07D 7/121* (2013.01); *G07D 7/122* (2013.01); *G07D 7/166* (2013.01); *G07D 7/187* (2013.01); *H04N 1/02815* (2013.01)

(58) Field of Classification Search
CPC ......... G07D 7/122; G07D 7/121; G07D 7/12; G07D 7/20; G07D 7/128; G07D 7/205; G07D 11/0066; G07D 11/0084; G07D 3/14; G07D 7/00; G07D 7/0006; G07D 7/0026; G07D 7/0013; G07D 7/0033
See application file for complete search history.

(56) References Cited

U.S. PATENT DOCUMENTS

| 6,570,648 | B1 * | 5/2003 | Muller-Rees et al. | 356/71 |
|---|---|---|---|---|
| 6,970,235 | B2 * | 11/2005 | Christophersen | 356/71 |
| 8,711,442 | B2 * | 4/2014 | Kawano et al. | 358/450 |
| 2006/0139622 | A1 * | 6/2006 | Mann | 356/71 |
| 2009/0310126 | A1 | 12/2009 | Klock et al. | |
| 2011/0038019 | A1 * | 2/2011 | Kawano et al. | 358/475 |
| 2011/0102772 | A1 * | 5/2011 | Bloss et al. | 356/71 |
| 2012/0218611 | A1 | 8/2012 | Ikari et al. | |

FOREIGN PATENT DOCUMENTS

| EP | 1785951 A1 | 5/2007 |
|---|---|---|
| EP | 2256698 A1 | 12/2010 |
| JP | 2010-277252 | 12/2010 |
| JP | 2012-060313 | 3/2012 |

OTHER PUBLICATIONS

Extended European Search Report issued in corresponding European Patent Application No. 13182942.6, mailed on Dec. 20, 2013; 3 pages.

\* cited by examiner

*Primary Examiner* — Michael P Stafira
(74) *Attorney, Agent, or Firm* — Baker Botts L.L.P.

(57) ABSTRACT

According to one embodiment, an image reading apparatus that reads an image of a sheet conveyed by a conveyance unit includes a first illumination unit to irradiate the sheet with visible light, a second illumination unit to irradiate the sheet with visible light and infrared light from an angle different from that of the first illumination unit, and an imaging unit to receive visible light and infrared light reflected from the sheet and to capture a visible image and an infrared image.

15 Claims, 8 Drawing Sheets

IMAGE READING APPARATUS AND SHEET PROCESSING APPARATUS

CROSS-REFERENCE TO RELATED APPLICATION

This application is based upon and claims the benefit of priority from Japanese Patent Application No. 2012-206218, filed on Sep. 19, 2012; the entire contents of which are incorporated herein by reference.

FIELD

Embodiments described herein relate generally to an image reading apparatus and a sheet processing apparatus.

BACKGROUND

Conventionally, sheet processing apparatuses that perform various types of inspections of sheets have been put to practical use. A sheet processing apparatus has an image reading apparatus that reads an image of a sheet. The sheet processing apparatus takes in sheets that are placed in a feed unit in such a manner that one sheet is taken in at a time, and conveys the sheets to the image reading apparatus (light detecting apparatus). The sheets that are processed by the sheet processing apparatus may be banknotes, bills, or securities etc.

The image reading apparatus has an illumination unit (illuminating apparatus) and a line image sensor. The image reading apparatus irradiates a sheet with light from the illumination unit. The line image sensor of the image reading apparatus reads reflected light from the conveyed sheet and detects optical features (characteristics) of that sheet. The sheet processing apparatus identifies the sheet by comparing various preset parameters with the detected characteristics.

In cases where a sheet is conveyed at a high speed, there is a possibility that flapping (a variation in the position of the sheet in a direction perpendicular to a conveyance surface) may occur within a reading range of the image reading apparatus. Thus, there has been proposed an image reading apparatus having an illuminating apparatus that achieves increased uniformity of intensity of light in the direction perpendicular to the conveyance surface of a sheet by illuminating a reading target from both sides of a reading optical axis.

It is assumed that such sheet processing apparatuses detect creases, folds, and the like in a sheet. However, in cases where a sheet, which is the reading target, is illuminated from both sides of the reading optical axis by an image reading apparatus such as that described above, the entire surface of the sheet will be uniformly illuminated. Thus, creases and folds cannot cast shadows, and so characteristic images of the creases and the folds cannot be acquired. Accordingly, there is a problem in that the creases and the folds cannot be identified.

SUMMARY OF THE INVENTION

It is thus an object of the present invention to provide an image reading apparatus and a sheet processing apparatus that read images with higher accuracy.

An image reading apparatus according to one embodiment is an image reading apparatus that reads an image of a sheet that is conveyed by a conveyance unit, the image reading apparatus including a first illumination unit to irradiate the sheet with visible light, a second illumination unit to irradiate the sheet with visible light and infrared light from an angle different from that of the first illumination unit, and an imaging unit to receive visible light and infrared light reflected from the sheet and to capture a visible image and an infrared image.

Furthermore, a sheet processing apparatus according to one embodiment is a sheet processing apparatus including a conveyance unit to convey a sheet, a first illumination unit to irradiate the sheet with visible light, a second illumination unit to irradiate the sheet with visible light and infrared light from an angle different from that of the first illumination unit, an imaging unit to receive visible light and infrared light reflected from the sheet and to capture a visible image and an infrared image, an identification unit to identify the sheet based on the visible image and the infrared image captured by the imaging unit and a preset parameter, and a sorting processor to sort the sheet based on an identification result of the identification unit.

According to the above-described configurations, it is possible to provide an image reading apparatus and a sheet processing apparatus that read images with higher accuracy.

DETAILED DESCRIPTION

According to one embodiment, there is provided an image reading apparatus that reads an image of a sheet that is conveyed by a conveyance unit, the image reading apparatus including a first illumination unit to irradiate the sheet with visible light, a second illumination unit to irradiate the sheet with visible light and infrared light from an angle different from that of the first illumination unit, and an imaging unit to receive visible light and infrared light reflected from the sheet and to capture a visible image and an infrared image.

Referring to the accompanying drawings, the following is a detailed description of an image reading apparatus and a sheet processing apparatus according to one embodiment.

Figure 1:
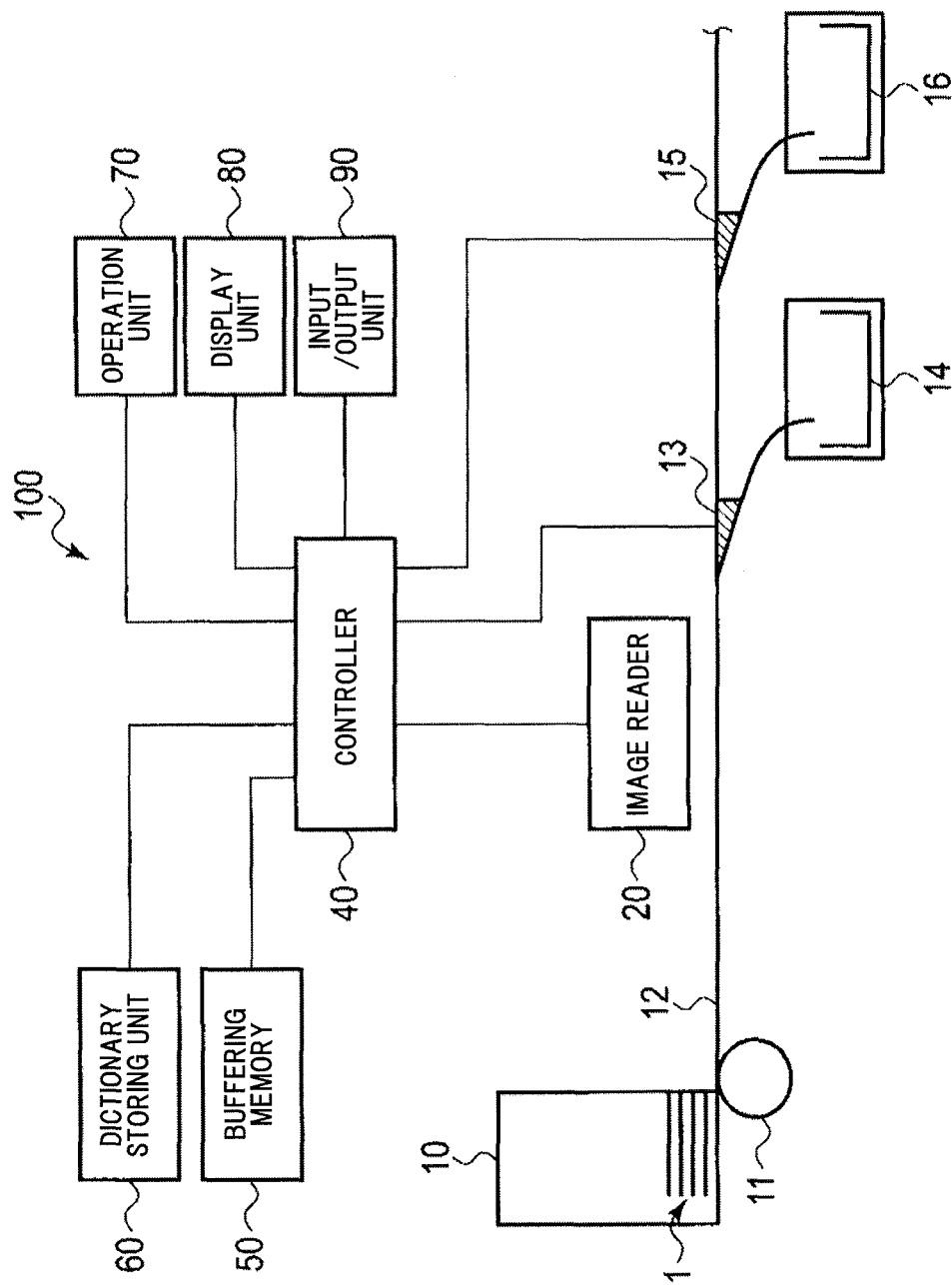
FIG. 1 is a block diagram for explaining a sheet processing apparatus according to one embodiment.

FIG. 1 shows an example of the configuration of a sheet processing apparatus 100 according to one embodiment. The sheet processing apparatus 100 can determine the category, such as the denomination and generation, of a sheet 1, the authenticity of the sheet 1, the fitness of the sheet 1, and the like based on the result of detection by an image reading apparatus.

The sheet processing apparatus 100 includes a supply unit 10, a separation roller 11, a conveyor 12, a first gate 13, a first stacker 14, a second gate 15, a second stacker 16, an image reader 20, a controller 40, a buffering memory 50, a dictionary storing unit 60, an operation unit 70, a display unit 80, and an input/output unit 90. Moreover, the sheet processing apparatus 100 includes a cutting unit, which is not shown, downstream of the second gate 15.

The controller 40 performs integrated control of the operations of the various units of the sheet processing apparatus 100. The controller 40 includes a CPU, a random-access memory, a program memory, a nonvolatile memory, and the like. The CPU performs various types of arithmetic processing. The random-access memory temporarily stores the results of arithmetic operations performed by the CPU. The program memory and the nonvolatile memory store various programs to be executed by the CPU, control data, and the like. The controller 40 is capable of performing various types of processing by the CPU executing the programs stored in the program memory.

The supply unit 10 stocks sheets 1 to be fed into the sheet processing apparatus 100. The supply unit 10 collectively receives the sheets 1 in a state in which the sheets are laid one on top of another.

The separation roller 11 is provided at a lower end of the supply unit 10. In the case where the sheets 1 are placed in the supply unit 10, the separation roller 11 comes into contact with the lowest sheet of the placed sheets 1 in a stacking direction. Rotation of the separation roller 11 causes the sheets 1 that are put in the supply unit 10 to be fed into the inside of the sheet processing apparatus 100 on a sheet-by-sheet basis in an ascending order from the lowest sheet to the highest sheet with respect to the stacking direction.

For example, each time the separation roller 11 makes one rotation, one sheet 1 is fed. Thus, the sheets 1 are fed at a constant pitch by the separation roller 11. The sheets 1 that have been fed by the separation roller 11 are introduced into the conveyor 12.

The conveyor 12 is a conveyance unit that conveys the sheets 1 to the various units within the sheet processing apparatus 100. The conveyor 12 includes a conveyor belt, which is not shown, a drive pulley, which is not shown, and the like. In the conveyor 12, the drive pulley is driven by a drive motor, which is not shown. The conveyor belt is operated by the drive pulley.

The conveyor 12 conveys the sheets 1, which have been fed by the separation roller 11, on the conveyor belt at a constant speed. It should be noted that the side of the conveyor 12 that is close to the separation roller 11 will be described as "upstream side", and the side that is opposite to the upstream side will be described as "downstream side".

The image reader 20 acquires an image from a sheet 1 that is conveyed by the conveyor 12. The image reader 20 includes, for example, a camera, an illumination unit, a background plate, an image reader, an image processor, and a controller. The camera and the illumination unit are positioned on the other side of the conveyor 12 from the background plate so as to face the background plate. The camera includes, for example, a line image sensor, such as a Charge Coupled Device (CCD) or a CMOS, and a lens that images light onto the sensor. The lens receives reflected light from the sheet 1 and reflected light from the background plate and images the reflected light onto the sensor. The sensor generates an electric signal in response to the light that has been imaged thereon, and acquires an image. In this manner, the image reader 20 reads an image of the sheet 1 that is conveyed by the conveyor 12.

Furthermore, the image reader 20 calculates characteristics from the acquired image. The image reader 20 supplies the calculated characteristics and the image to the controller 40.

Also, the controller 40, which serves as an identification unit, determines the category, such as the denomination and generation, of the sheet 1 based on the supplied characteristics.

The controller 40 determines the authenticity of the sheet 1 based on the supplied characteristics and stored information regarding the determined category, such as the denomination and generation. That is to say, the controller 40 serving as the identification unit determines whether the sheet 1 is genuine or counterfeit.

Furthermore, the controller 40 determines the fitness of the sheet 1 based on the supplied characteristics and the stored information regarding the determined category, such as the denomination and generation. That is to say, the controller 40 serving as the identification unit determines whether the sheet 1 is a fit sheet that is fit for recirculation or an unfit sheet that is unfit for recirculation.

The first gate 13 and the second gate 15 are provided downstream from the image reader 20 along the conveyor 12. The first gate 13 and the second gate 15 are each operated based on control of the controller 40. The controller 40 controls the first gate 13 and the second gate 15 in accordance with the various determination results with respect to the sheet 1. In other words, the first gate 13 and the second gate 15 function as sorting processors.

The first gate 13 switches the destination of the sheet 1 between the first stacker 14 and the second gate 15. The second gate 15 switches the destination of the sheet 1 between the second stacker 16 and the cutting unit.

The controller 40 controls the first gate 13 and the second gate 15 so that any sheet 1 that has been determined to be a fit sheet is conveyed to the first stacker 14 or the second stacker 16. That is to say, the controller 40 controls the various units so that fit sheets are sorted by denomination and stacked.

Also, the controller 40 controls the first gate 13 and the second gate 15 so that any sheet 1 that has been determined to be an unfit sheet is conveyed to the cutting unit that is provided downstream of the second gate 15. That is to say, the controller 40 controls the various units so that any sheet 1 that has been determined to be an unfit sheet is conveyed to the cutting unit and cut by the cutting unit.

The buffering memory 50 stores various processing results. For example, the buffering memory 50 stores an image acquired by the image reader 20. Moreover, the buffering memory 50 stores characteristics and the like calculated from the image. It should be noted that the random-access memory or the nonvolatile memory included in the controller 40 may be substituted for the buffering memory 50.

The dictionary storing unit 60 stores various parameters that are used in the above-described identification processing. The dictionary storing unit 60, for example, stores parameters for each category of sheets in advance. The controller 40 performs the identification processing based on the parameters stored in the dictionary storing unit 60 and the above-described characteristics. Thus, the controller 40 can determine the category, authenticity, and fitness of the sheet.

The operation unit 70 accepts various operation inputs by an operator. The operation unit 70 generates an operation signal based on an operation input by the operator, and transmits the generated operation signal to the controller 40. The display unit 80 displays various types of screens based on control of the controller 40. For example, the display unit 80 displays various types of operation guidance, processing results, and the like to the operator. It should be noted that the operation unit 70 and the display unit 80 may also be formed as a single member serving as a touch panel.

The input/output unit 90 exchanges data with an external device or a storage medium that is connected to the sheet processing apparatus 100. For example, the input/output unit 90 may include a disk drive, a USB connector, a LAN connector, or other interfaces that enable data exchange. The sheet processing apparatus 100 can acquire data from an external device or a storage medium that is connected to the input/output unit 90. Moreover, the sheet processing apparatus 100 can also transmit the processing result to an external device or a storage medium that is connected to the input/output unit 90.

Figure 2:
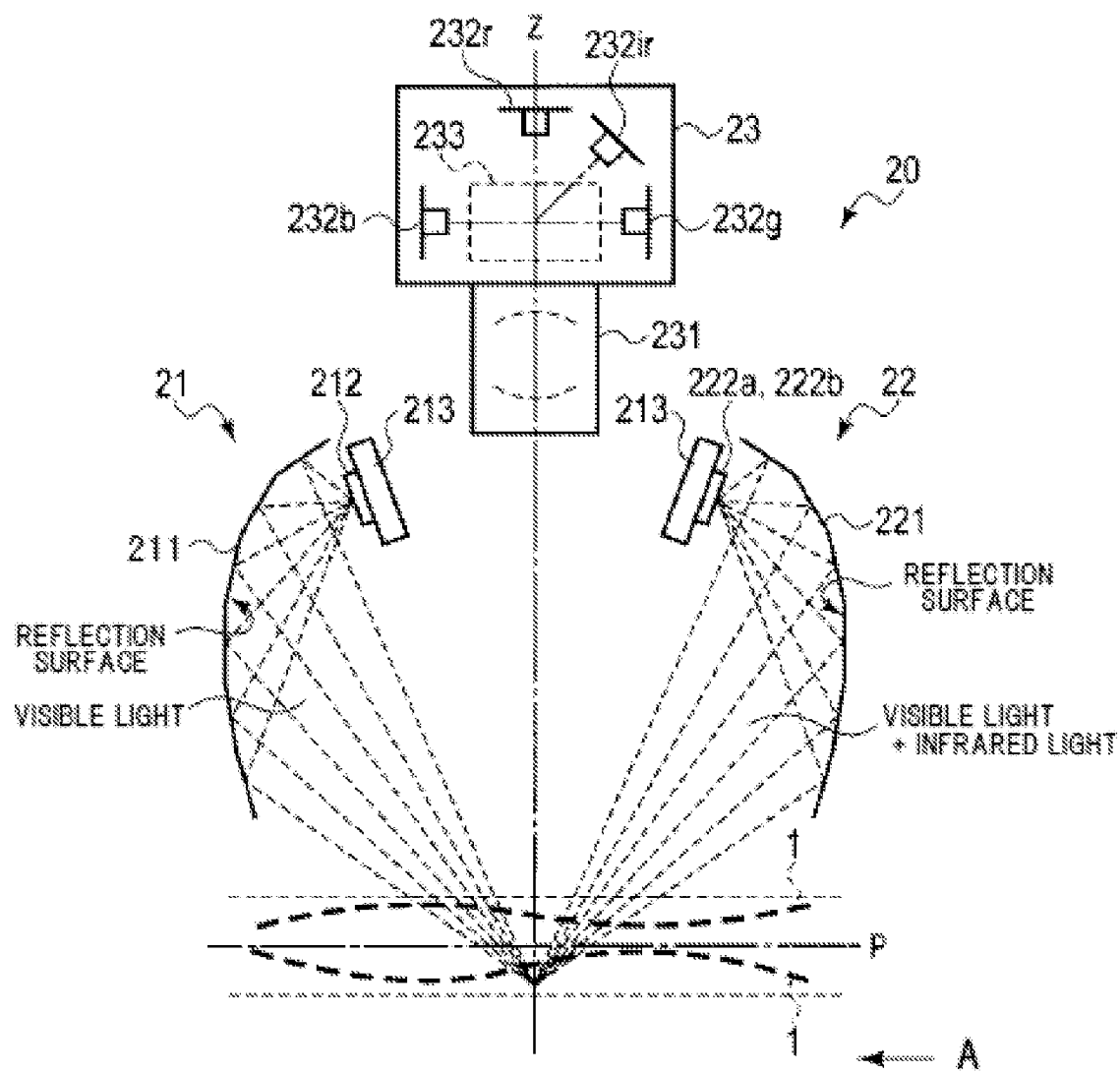
FIG. 2 is a schematic diagram for explaining an image reading apparatus according to one embodiment.

FIG. 2 shows an example of the image reader (image reading apparatus) 20. The image reader 20 includes an illumination unit 21 (first illumination unit 21), an illumination unit 22 (second illumination unit 22), and a camera 23. The image reader 20 reads an image from a sheet 1 that is conveyed by the conveyor 12 in a direction of arrow A indicated in FIG. 2. It should be noted that the image reader 20 captures an image of a predetermined range on a conveyance surface P on which the sheet 1 is conveyed.

The illumination unit 21 irradiates the sheet 1 that is being conveyed by the conveyor 12 with light. The illumination unit 21 directs light at an irradiation range that is larger than at least a reading range of the camera 23. The illumination unit 21 is configured so as to be able to irradiate the sheet 1 with visible light that does not contain infrared light.

The illumination unit 22 irradiates the sheet 1 that is being conveyed by the conveyor 12 with light. The illumination unit 22 directs light at an irradiation range that is larger than at least the reading range of the camera 23. Moreover, the illumination unit 22 is configured so as to be able to irradiate the sheet 1 with at least visible light and infrared light at the same time.

The illumination unit 21 and the illumination unit 22 each include a light source and an optical system. The light source is a device that emits light. For example, the light source may include an LED, an organic EL, a cold-cathode tube, a halogen light source, a fluorescent lamp, or other light emitting devices. The optical system collects and guides light radiated from the light source to the reading range of the camera 23.

The illumination unit 21 and the illumination unit 22 (illuminating apparatus) irradiate a surface of a sheet, which is a matter to be inspected, with light. In this case, it is desirable that the illuminating apparatus has a uniform light intensity distribution along the length of the line image sensor.

In the case where a sheet 1 is present within the reading range of the camera 23, light from the illumination units 21 and 22 falls on the sheet 1. The light falling on the sheet 1 is reflected by the surface of the sheet 1.

The camera 23 includes a photodiode array (line image sensor) in which photodiodes such as CCDs, CMOSes, or the like are arranged in a line, and an optical system such as, for example, a lens that images light onto the line image sensor. The line image sensor includes a plurality of imaging devices (pixels) that convert incident light into electric signals, or in other words, an image and that are arranged in a line.

The camera 23 has an imaging optical axis extending in, for example, a direction (z-axis direction) that is perpendicular to the conveyance surface P on which the sheet 1 is conveyed. The camera 23 receives reflected light of the light that has been directed from the illumination units 21 and 22 at the sheet 1, and acquires an image.

The line image sensor accumulates electric charges in response to incident light. Also, the line image sensor outputs an analog voltage level corresponding to the electric charge accumulated in each pixel of the line image sensor to an analog-to-digital converter (A/D converter), which is not shown, at a predetermined timing.

The A/D converter converts an analog signal supplied from the line image sensor into a digital signal. The camera 23 converts analog signals that have been successively acquired by the line image sensor into digital signals. Based on the successive digital signals, the camera 23 can acquire an image of the sheet 1.

It should be noted that with regard to the sheet 1 that is conveyed to an imaging range of the camera 23, besides a case where the sheet 1 is conveyed in a normal state in which the sheet 1 is not skewed, there are cases where the sheet 1 may be conveyed in a state in which the sheet 1 is displaced or skewed, that is, in a slid/skewed state (slanting conveyance state). For this reason, the camera 23 corrects the image of the sheet 1 as appropriate for the conveyance state of the sheet 1 that is conveyed.

That is to say, based on the image of the sheet 1, the camera 23 performs position detection (detection of the sliding amount) and skew detection (detection of the amount of skew) with respect to the sheet 1. The camera 23 corrects the image of the sheet 1 in accordance with the sliding amount or the amount of skew. Furthermore, the camera 23 calculates characteristics from the corrected image of the sheet 1. The camera 23 sends the calculated characteristics to the controller 40.

The controller 40 determines the authenticity, denomination, fitness, and the like of the sheet 1 based on the supplied characteristics.

Figure 3:
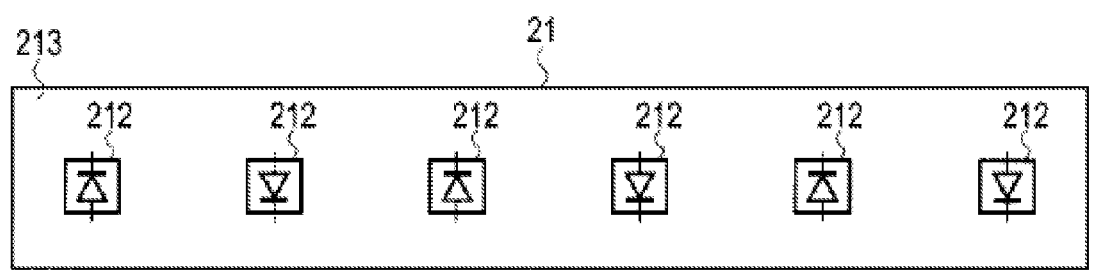
FIG. 3 is a front view for explaining an image reading apparatus according to one embodiment.

The illumination unit 21 includes a reflection member 211, light sources 212, and a mounting board 213. FIG. 3 shows an example of the configuration of the light sources 212 and the mounting board 213 of the illumination unit 21. The light sources 212 are light emitting devices that emit light. As described above, the light sources 212 are configured so as to emit visible light that does not contain infrared light. The illumination unit 21 includes LEDs, which serve as the plurality of light sources 212, that are arranged at predetermined intervals in a line extending in a direction (direction parallel to a scanning direction of the camera 23) that is orthogonal to the conveyance direction A (FIG. 2) of the sheet 1. That is to say, the illumination unit 21 includes a light emitting unit that emits visible light at a linear range.

It should be noted that although an example in which LEDs are used as the light sources 212 will be described in this embodiment, the present invention is not limited to this configuration. With regard to the light sources 212, any configuration can be adopted as long as the light sources 212 can emit visible light that does not contain infrared light.

The mounting board 213 is a base on which the LEDs, which serve as the light sources 212, are disposed. The mounting board 213 is formed of, for example, aluminum, copper, or other materials having a high heat-dissipating property. Moreover, an electric circuit for lighting the light sources 212 is installed on the mounting board 213.

The reflection member 211 includes a mirror (reflection surface) that totally reflects light. As shown in FIG. 2, the mirror of the reflection member 211 is formed into a polygonal curve-like shape. That is to say, the reflection member 211 has a shape formed from a plurality of connected straight lines that are inscribed in or circumscribe an arc of a reference ellipse line. This means that the reflection member 211 has a plurality of reflection surfaces that form different angles from one another with the light sources 212 and the conveyance surface P.

The mirror of the reflection member 211 is composed of, for example, a metal member made of aluminum or the like.

That is to say, the metal member is cut out so as to have a polygonal curve-like shape in cross section. Furthermore, surfaces of the metal member are polished, and thus specular surfaces (reflection surfaces) are formed. In this manner, the mirror of the reflection member 211 can be formed.

Moreover, the mirror of the reflection member 211 may also be formed of, for example, a sheet metal that is bent. In this case, the sheet metal is bent so as to have a polygonal curve-like shape in cross section. Furthermore, the reflection surfaces, which are specular surfaces, are formed by polishing surfaces of the sheet metal. In this manner, the mirror of the reflection member 211 can be formed.

Moreover, the mirror of the reflection member 211 may also be formed from, for example, a plurality of rectangular mirrors. In this case, the plurality of mirrors are combined together so as to form a polygonal curve-like shape in cross section. In this manner, the mirror of the reflection member 211 can be formed.

It should be noted that as described above, the specular surfaces of the reflection member 211 are configured so that light from the light sources 212 is incident on the conveyance surface P, on which the sheet 1 is conveyed, at a predetermined angle. Thus, the illumination unit 21 can send visible light at a predetermined angle with respect to the conveyance surface P, on which the sheet 1 is conveyed.

Figure 4:
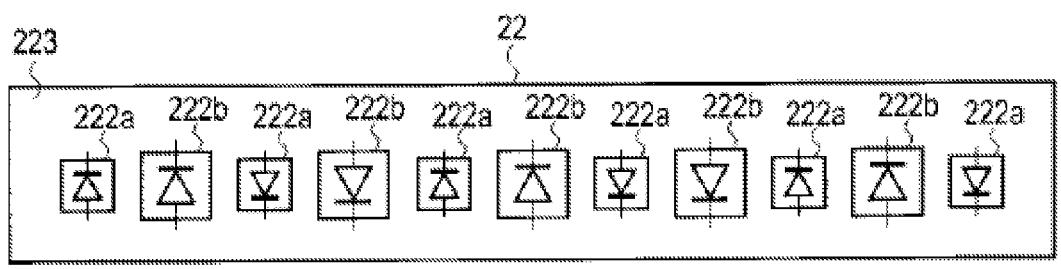
FIG. 4 is a front view for explaining an image reading apparatus according to one embodiment.

The illumination unit 22 includes a reflection member 221, light sources 222, and a mounting board 223. FIG. 4 shows an example of the configuration of the light sources 222 and the mounting board 223 of the illumination unit 22. The light sources 222 are light emitting devices that emit light. The illumination unit 22 includes a plurality of light sources 222$a$ that emit visible light and a plurality of light sources 222$b$ that emit infrared light. The light sources 222$a$ may be, for example, LEDs that emit visible light. The light sources 222$b$ may be LEDs that emit infrared light.

The light sources 222$a$ are arranged at predetermined intervals in a line extending in a direction (direction parallel to the scanning direction of the camera 23) that is orthogonal to the conveyance direction of the sheet 1. The light sources 222$b$ are provided between adjacent light sources 222$a$. That is to say, the illumination unit 22 includes a light emitting unit in which the light sources 222$a$ and the light sources 222$b$ are alternately arranged in a line. This light emitting unit enables the illumination unit 22 to emit mixed light of visible light and infrared light at a linear range.

It should be noted that although an example in which LEDs are used as the light sources 212 will be described in this embodiment, the present invention is not limited to this configuration. With regard to the configuration of the light sources 212, any configuration can be adopted as long as the light sources 212 can emit light that does not contain specific wavelengths (e.g., infrared light).

It should be noted that the mounting board 223 has the same configuration as the mounting board 213 of the illumination unit 21, and so a description thereof will be omitted. Also, the reflection member 221 has the same configuration as the reflection member 211 of the illumination unit 21, and so a description thereof will be omitted. It should be noted that the reflection member 221 and the light sources 222 of the illumination unit 22 are positioned on the other side of the imaging optical axis of the camera 23 from and symmetrically to the reflection member 211 and the light sources 212 of the illumination unit 21.

With this configuration, the illumination unit 22 can cause visible light and infrared light from the light sources 222 to be reflected from the reflection member 221 in such a manner that the intensity of visible light and infrared light from the light sources 222 is made uniform in the direction perpendicular to the conveyance surface P. Thus, the illumination unit 22 can irradiate the sheet 1 with visible light and infrared light having stable intensity regardless of movement of the sheet 1 in the direction (z-axis direction) of the imaging optical axis.

Moreover, the specular surfaces of the reflection member 221 are configured so that light from the light sources 222 is incident on the conveyance surface P, on which the sheet 1 is conveyed, at a predetermined angle. Thus, the illumination unit 22 can send visible light and infrared light at a predetermined angle with respect to the conveyance surface P, on which the sheet 1 is conveyed.

It should be noted that the various units of the illumination unit 22 are positioned on the other side of the imaging optical axis of the camera 23 from and symmetrically to those of the illumination unit 21. That is to say, the illumination unit 21 and the illumination unit 22 can irradiate the imaging range of the camera 23 with visible light from both the upstream side and the downstream side with respect to the conveyor 12. Furthermore, the illumination unit 22 can irradiate the imaging range of the camera 23 with infrared light from the downstream side (or the upstream side) with respect to the conveyor 12. It should be noted that there is no limitation on the order in which the illumination unit 21 and the illumination unit 22 are arranged in the conveyance direction, and the illumination unit 21 may be arranged upstream of the illumination unit 22 and vice versa.

With this configuration, with regard to visible light, light irradiation from the illumination unit 21 and light irradiation from the illumination unit 22 overlap each other and are thus made more uniform in the direction perpendicular to the conveyance surface P. With regard to infrared light, a sheet is irradiated by light irradiation from one side, that is, the illumination unit 22. Thus, the sheet 1 can be irradiated with light having stable intensity regardless of movement of the sheet 1 in the direction (z-axis direction) of the imaging optical axis.

It should be noted that the camera 23 has a function of imaging light that is coaxially incident thereon with a plurality of sensors. For this purpose, the camera 23 includes a plurality of line image sensors. In addition, the optical system can separate light that has entered on a single optical axis into its spectral components and image the separated light components onto the plurality of line image sensors.

As shown in FIG. 2, the camera 23 includes a lens 231, a plurality of sensors 232, and a spectral member 233. The lens 231 is an optical system that receives light and images the received light onto the sensors 232. The lens 231 receives light from a predetermined range and images the received light onto the sensors 232.

The camera 23 includes the plurality of line image sensors 232 that respectively detect, for example, red (R), green (G), and blue (B) components of visible light and infrared light (IR). That is to say, the camera 23 includes a line image sensor 232$r$ that detects the red component of light and generates an R signal, a line image sensor 232$g$ that detects the green component of light and generates a G signal, a line image sensor 232$b$ that detects the blue component of light and generates a B signal, and a line image sensor 232$ir$ that detects infrared light and generates an IR signal.

The spectral member 233 has a prism that separates light entering on a single optical axis into light components in four different wavelength regions, that is, red, green, blue, and infrared light components. The spectral member 233 separates the red component of light from the incident light and images the separated light component onto the line image sensor 232$r$. The spectral member 233 separates the green component of light from the incident light and images the separated light component onto the line image sensor 232g. The spectral member 233 separates the blue component of light from the incident light and images the separated light component onto the line image sensor 232b. The spectral member 233 separates the infrared light component from the incident light and images the separated light component onto the line image sensor 232ir. That is to say, the spectral member 233 separates light entering on the same optical axis into a plurality of light components having different wavelengths.

Moreover, the camera 23 may also be configured so as to image light components coming from different positions and having different wavelengths onto different line image sensors instead of imaging light that enters the camera 23 on a single optical axis onto a plurality of line image sensors.

For example, the camera 23 may also be configured so as to detect different color components of light from different imaging ranges that are spaced apart with respect to the conveyance direction of the sheet 1 by a predetermined distance. The camera 23 may also be configured so as to correct for misalignment among signals with respect to different colors detected from different positions by performing image signal processing and to acquire a visible image of the sheet 1.

The camera 23 outputs the signals detected by the line image sensors 232r, 232g, and 232b as electric signals for a visible image. The A/D converter can acquire the visible image based on the electric signals for the visible image.

Moreover, the camera 23 outputs the signal detected by the line image sensor 232ir as an electric signal for an infrared image (IR image). The A/D converter can acquire the infrared image based on the electric signal for the infrared image.

That is to say, in cases where the sheet 1 is present within the imaging range of the camera 23, visible light and infrared light diffusely reflected from the surface of the sheet 1 enter the lens 231 of the camera 23 on the same optical axis. The camera 23 can acquire a visible image and an infrared image from light that contains visible light and infrared light entering on the same optical axis.

It should be noted that visible light is irradiated onto the sheet 1 at predetermined angles from both upstream and downstream of the imaging optical axis of the camera 23 with respect to the conveyor 12. For this reason, in cases where the sheet 1 has a crease, a fold, or the like, the image reader 20 can read a visible image in a state in which a shadow is unlikely to be cast.

Moreover, infrared light is irradiated onto the sheet 1 at a predetermined angle from either upstream or downstream of the imaging optical axis of the camera 23 with respect to the conveyor 12. For this reason, in cases where the sheet 1 has a crease, a fold, or the like, the image reader 20 can read an infrared image in a state in which a shadow is likely to be cast.

Figure 5:
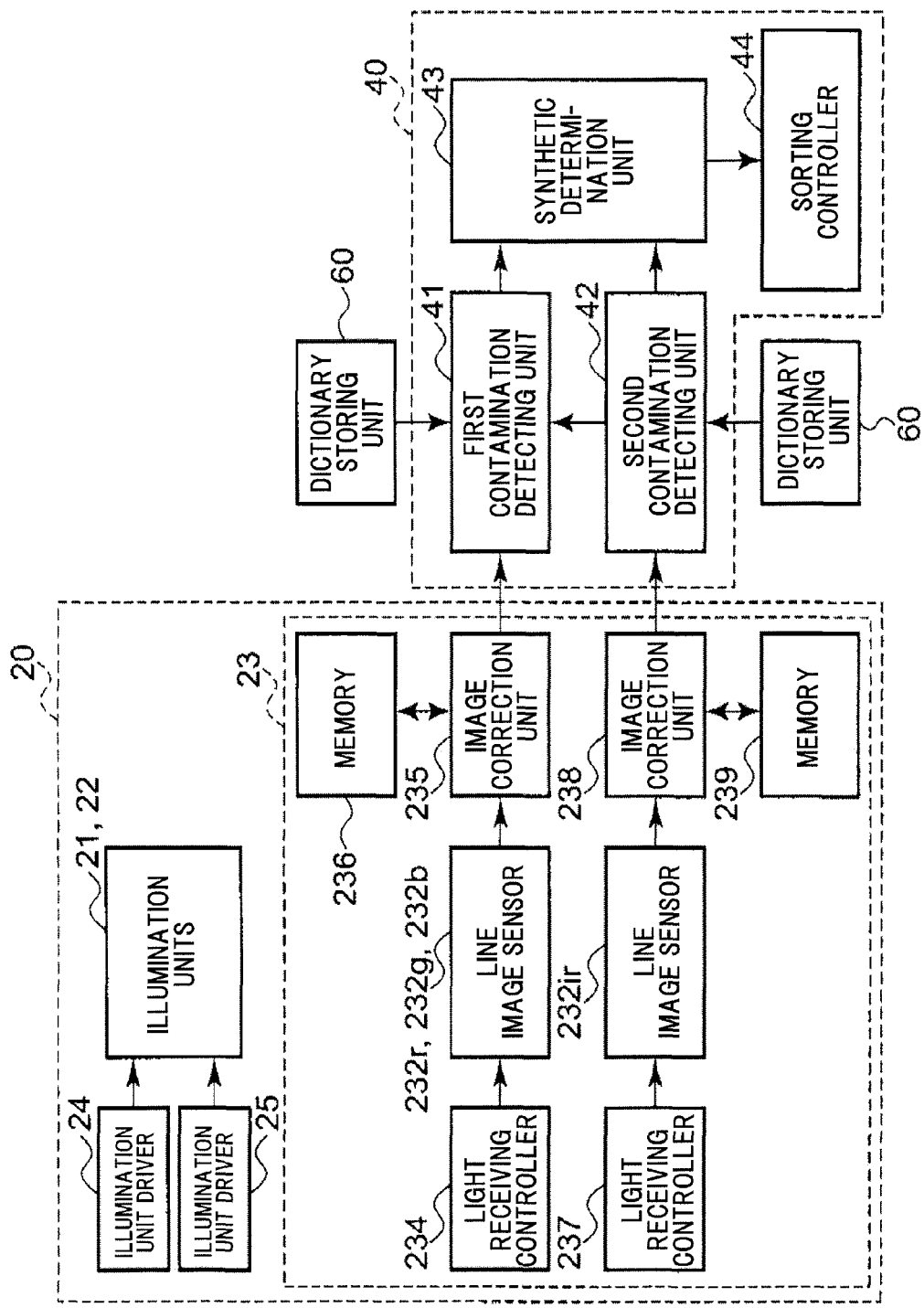
FIG. 5 is a block diagram for explaining an image reading apparatus according to one embodiment.

FIG. 5 shows an example of signal processing by the image reader 20. The image reader 20 includes an illumination unit driver 24 for driving the illumination unit 21 and an illumination unit driver 25 for driving the illumination unit 22. The illumination unit driver 24 controls the lighting and the light emission intensity of the illumination unit 21. The illumination unit driver 25 controls the lighting and the light emission intensity of the illumination unit 22.

Moreover, the camera 23 of the image reader 20 includes a light receiving controller 234, the line image sensors 232r, 232g, and 232b serving as visible light sensors, an image correction unit 235, and a memory 236 that stores data for correction.

The light receiving controller 234 controls signal detection by the line image sensors 232r, 232g, and 232b. For example, the light receiving controller 234 controls the line image sensors 232r, 232g, and 232b so that these line image sensors periodically detect signals at intervals suited to the conveyance speed of the sheet 1. The camera 23 performs A/D conversion of the signals detected by the line image sensors 232r, 232g, and 232b by means of the A/D converter, which is not shown, and acquires a visible image.

The image correction unit 235 corrects the visible image using the data for correction that is stored in the memory 236. The memory 236 is a memory in which preset data for correction is stored.

For example, the memory 236 stores, as the data for correction, correction values that are generated based on, for example, pixel-to-pixel non-uniformity of sensitivity of the line image sensors 232r, 232g, and 232b, unevenness in brightness of the illumination units 21 and 22, and/or optical properties of the lens 231. Based on the data for correction that is stored in the memory 236, the image correction unit 235 performs a shading correction, a brightness correction, a distortion correction, and the like of the visible image. The camera 23 sends the corrected visible image to the controller 40.

Moreover, the camera 23 of the image reader 20 includes a light receiving controller 237, the line image sensor 232ir serving as an infrared light sensor, an image correction unit 238, and a memory 239 that stores data for correction.

The light receiving controller 237 controls signal detection by the line image sensor 232ir. For example, the light receiving controller 237 controls the line image sensor 232ir so that this line image sensor periodically detects signals at intervals suited to the conveyance speed of the sheet 1. Moreover, a configuration may also be adopted in which the light receiving controller 237 controls the line image sensor 232ir so that this sensor detects signals at the same timing as the line image sensors 232r, 232g, and 232b.

The camera 23 performs A/D conversion of the signals detected by the line image sensor 232ir by means of the A/D converter, which is not shown, and acquires an infrared image.

The image correction unit 238 corrects the infrared image using the data for correction that is stored in the memory 239. The memory 239 is a memory in which preset data for correction is stored.

For example, the memory 239 stores, as the data for correction, correction values that are generated based on, for example, pixel-to-pixel non-uniformity of sensitivity of the line image sensor 232ir, unevenness in brightness of the illumination unit 22, and/or optical properties of the lens 231. Based on the data for correction stored in the memory 239, the image correction unit 238 performs a shading correction, a brightness correction, a distortion correction, and the like of the infrared image. The camera 23 sends the corrected infrared image to the controller 40.

The controller 40 functions as a first contamination detecting unit 41, a second contamination detecting unit 42, a synthetic determination unit 43, and a sorting controller 44 by, for example, executing corresponding programs.

As described above, the controller 40 stores the visible image and the infrared image supplied from the image reader 20 in the buffering memory 50. Moreover, the controller 40 reads out parameters, which serve as criteria, stored in the dictionary storing unit 60.

The first contamination detecting unit 41 compares the parameters read out from the dictionary storing unit 60 with the visible image supplied from the camera 23. Based on the comparison result, the first contamination detecting unit 41 detects contamination of the sheet 1. For example, the first contamination detecting unit 41 detects contamination such as a stain, a scribble, and the like on the sheet 1. The first contamination detecting unit 41 sends the detection result (first detection result) to the synthetic determination unit 43.

The first contamination detecting unit 41 evaluates an output signal quantity of the visible image and calculates the absolute magnitude of brightness. The first contamination detecting unit 41, for example, divides the visible image into a plurality of regions. The first contamination detecting unit 41 calculates items, such as the average value, distribution frequency (histogram), maximum value, minimum value, standard deviation, and dispersion, of brightness for each divided region.

For example, if the visible image is an image that has been detected based on the RGB light components in three wavelength regions, the first contamination detecting unit 41 calculates the above-described items for each color. Moreover, the first contamination detecting unit 41 may also be configured so as to calculate the above-described items between the colors.

The first contamination detecting unit 41 compares data (reference parameters) that has been collected from a fit sheet in advance with the values calculated from the visible image, thereby determining whether or not there is contamination of the sheet 1 and the extent of contamination (state in which the sheet 1 is worn, yellowing, and the like).

Moreover, the first contamination detecting unit 41 extracts differences (deviations) in brightness between adjacent pixels in a watermark portion or a margin portion such as an end face or the like of the visible image. The first contamination detecting unit 41 can detect dirt such as a scribble on the sheet 1 based on the extracted deviations. Furthermore, the first contamination detecting unit 41 makes a comprehensive determination about whether or not there is any scribble or crease on the sheet 1 based on the deviations between adjacent pixels as well as a scribble and a crease extracted in the neighborhood of a region where the deviations between adjacent pixels are extracted. It should be noted that the first contamination detecting unit 41 performs extraction of deviations between adjacent pixels in both of the scanning direction of the line image sensors 232 and the conveyance direction of the sheet 1. In this manner, the first contamination detecting unit 41 can reduce variation in performance depending on the direction of a scribbled line.

The second contamination detecting unit 42 compares parameters read out from the dictionary storing unit 60 with the infrared image supplied from the camera 23. Based on the comparison result, the second contamination detecting unit 42 detects contamination of the sheet 1. For example, the second contamination detecting unit 42 detects a crease, a fold, a scribble, and the like on the sheet 1. The second contamination detecting unit 42 sends the detection result (second detection result) to the synthetic determination unit 43.

The second contamination detecting unit 42 evaluates an output signal quantity of the infrared image and calculates the absolute magnitude of brightness. The second contamination detecting unit 42, for example, divides the infrared image into a plurality of regions. The second contamination detecting unit 42 calculates items, such as the average value, distribution frequency (histogram), maximum value, minimum value, standard deviation, dispersion, and the like, of brightness for each divided region.

The second contamination detecting unit 42 compares data (reference parameters) that has been collected from a fit sheet in advance with the values calculated from the infrared image, thereby determining whether or not there is a crease, a fold, or a scribble on the sheet 1, the extent of contamination (state in which the sheet 1 is worn, yellowing, and the like), and so on.

It should be noted that the second contamination detecting unit 42 may also send information regarding the infrared image or the brightness of the infrared image to the first contamination detecting unit 41. In this case, the first contamination detecting unit 41 calculates the ratio between the brightness of the infrared image and the brightness of the visible image. The first contamination detecting unit 41 may also be configured so as to detect yellowing, contamination, and the like on the sheet 1 based on the calculated ratio.

The synthetic determination unit 43 makes a comprehensive determination about the conditions of the sheet 1 based on the first detection result supplied from the first contamination detecting unit 41 and the second detection result supplied from the second contamination detecting unit 42. For example, based on the first detection result and the second detection result, the synthetic determination unit 43 determines whether or not there is a crease in the sheet 1, whether or not there is a fold on the sheet 1, whether or not there is a stain on the sheet 1, whether or not there is a scribble on the sheet 1, the extent of contamination (state in which the sheet 1 is worn, yellowing, and the like), and so on.

Furthermore, the synthetic determination unit 43 receives a result of inspection by other inspection units such as, for example, a magnetic detecting unit, which is not shown. The synthetic determination unit 43 determines the denomination, authenticity, fitness, and the like of the sheet 1 based on the detection results by a plurality of detecting units, including the first detection result and the second detection result.

The sorting controller 44 controls the gates, conveyance path, and the like so as to sort the sheet 1 depending on the result of determination by the synthetic determination unit 43. That is to say, the sorting controller 44 controls the first gate 13 and the second gate 15 so that the sheet 1 is conveyed to the first stacker 14 or the second stacker 16 if the sheet 1 is determined to be a fit sheet. Furthermore, the sorting controller 44 sorts the sheets 1 of different denominations into different stackers.

Moreover, the sorting controller 44 controls the first gate 13 and the second gate 15 so that the sheet 1 is conveyed to the cutting unit, which is provided downstream of the second gate 15, if the sheet 1 is determined to be an unfit sheet. That is to say, the controller 40 controls the various units so that the sheet 1 that is determined to be an unfit sheet is conveyed to the cutting unit and cut by the cutting unit.

Furthermore, the sorting controller 44 controls the first gate 13 and the second gate 15 so that the sheet 1 is conveyed to a rejected sheet stacker, which is not shown, if the sheet 1 is determined to be a counterfeit.

As described above, the image reader 20 includes the illumination unit 21 and the illumination unit 22, which irradiate the sheet 1 that is being conveyed with light from predetermined angles. The illumination unit 21 and the illumination unit 22 enable the image reader 20 to irradiate the sheet 1 with visible light at predetermined angles from both upstream and downstream of the imaging optical axis of the camera 23 with respect to the conveyor 12. Thus, in cases where the sheet 1 has a crease, a fold, or the like, the image reader 20 can read a visible image in a state in which a shadow is unlikely to be cast.

Furthermore, the illumination unit 22 enables the image reader 20 to irradiate the sheet 1 with infrared light at a predetermined angle from either upstream or downstream of the imaging optical axis of the camera 23 with respect to the conveyor 12. Thus, in the case where the sheet 1 has a crease, a fold, or the like, the image reader 20 can read an infrared image in a state in which a shadow is likely to be cast.

Thus, the image reader can acquire a visible image and an infrared image that are more useful in determination of the fitness of the sheet 1. Consequently, it is possible to provide an image reading apparatus and a sheet processing apparatus that read images with higher accuracy.

It should be noted that in the above-described embodiment, the camera 23 of the image reader 20 has been described as having a configuration in which light that is received by the spectral member 233 on a single optical axis is separated into light components in four different wavelength regions. However, the present invention is not limited to this configuration. The spectral member 233 may also be configured so as to separate light into a larger number of color components of light. In this case, the camera 23 of the image reader 20 includes the spectral member 233 that separates light entering on a single optical axis into those various color components and a plurality of line image sensors 232 corresponding to the respective color components.

Moreover, the spectral member 233 may also be configured so as to separate light into a fewer number of color components of light. It is sufficient that the spectral member 233 can separate light entering on a single optical axis into at least a single visible light component and infrared light. In addition, in this case, it is sufficient that the camera 23 of the image reader 20 includes a line image sensor that detects the separated visible light and the line image sensor 232ir that detects the separated infrared light.

Moreover, the more acute the irradiation angle of infrared light that is directed at the sheet 1, the more likely a shadow is to be cast in the case where the sheet 1 has a crease, a fold, or the like. For this reason, the image reader 20 may also be configured so as to include an illumination unit 22 that can irradiate the sheet 1 with light at a more acute angle.

Figure 6:
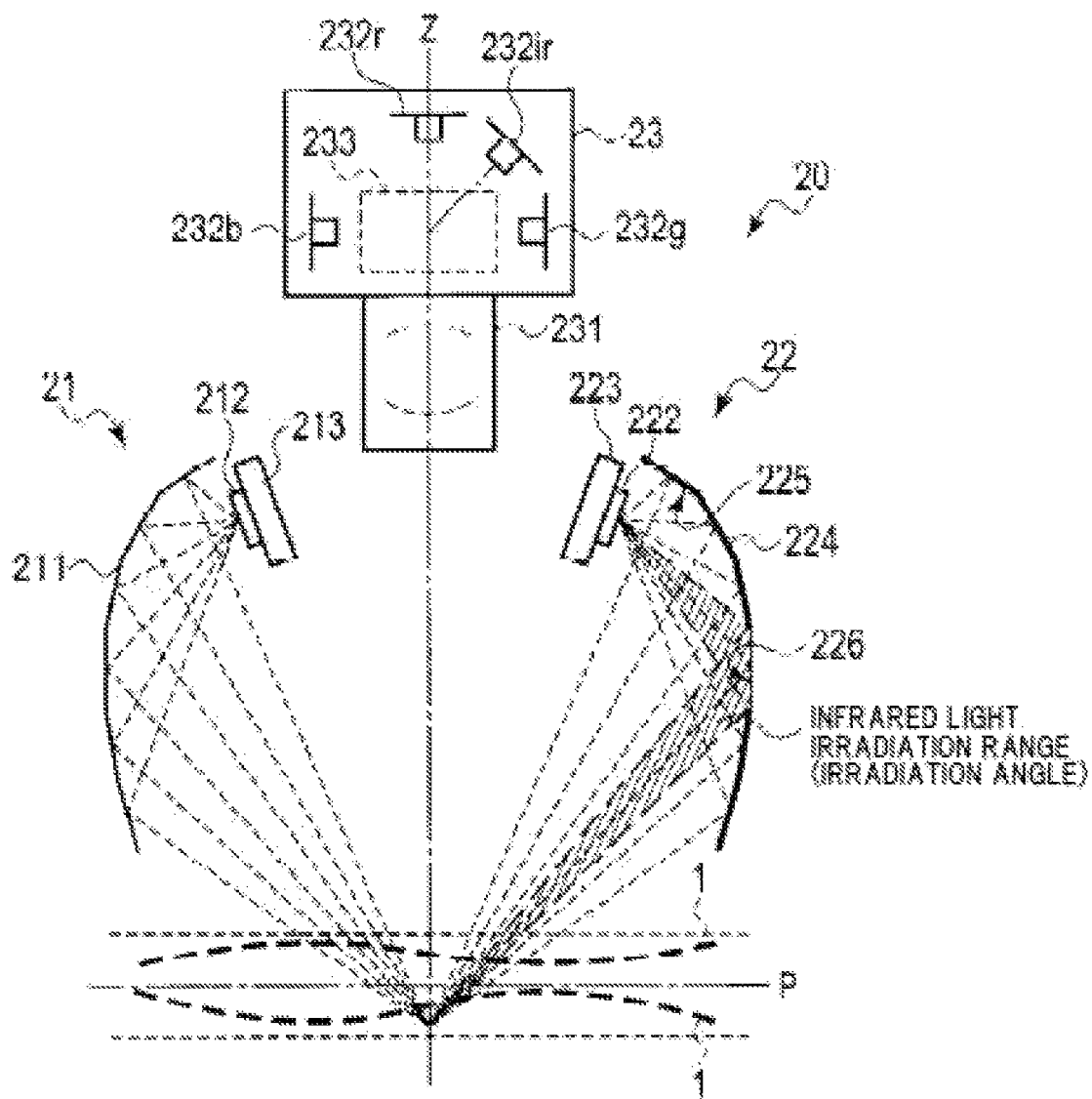
FIG. 6 is a schematic diagram for explaining an image reading apparatus according to one embodiment.

FIG. 6 shows another example of the configuration of the image reader 20. The image reader 20 includes the illumination unit 21, the illumination unit 22, and the camera 23. It should be noted that the illumination unit 21 and the camera 23 have the same configurations as those of the example shown in FIG. 2. The illumination unit 22 includes a reflection member 224, the light sources 222, and the mounting board 223. It should be noted that the light sources 222 and the mounting board 223 have the same configurations as those of the example shown in FIG. 2.

The reflection member 224 includes a total reflection surface 226 that totally reflects visible light and infrared light and infrared light low-reflection surfaces 225 that totally reflect visible light and absorb infrared light.

As shown in FIG. 6, like the reflection member 221, the reflection member 224 also has a polygonal curve-like shape formed from a plurality of connected straight lines in cross section. The infrared light low-reflection surfaces 225 and the total reflection surface 226 of the reflection member 224 are provided at a plurality of different angles with respect to the conveyance surface P.

It should be noted that in the example shown in FIG. 6, the total reflection surface 226 is provided in one surface, and the infrared light low-reflection surfaces 225 are provided in the other surfaces. If the total reflection surface 226 that reflects infrared light is provided in a limited manner as described above, the reflection member 224 can irradiate the sheet 1 with infrared light at a more acute irradiation angle.

That is to say, the reflection member 224 can make infrared light that is directed at the sheet 1 even more highly directional. Thus, the image reader 20 can irradiate the sheet 1 with light that is even more likely to cast a shadow in the case where the sheet 1 has a crease, a fold, or the like.

It should be noted that the image reader 20 can control the irradiation angle of infrared light to be directed at the sheet 1 in accordance with the number of total reflection surfaces 226 of the reflection member 224. Furthermore, the image reader 20 can control the angle of the optical axis of infrared light with respect to the sheet 1 in accordance with the position of the total reflection surface 226 of the reflection member 224. Thus, the image reader 20 can irradiate the sheet 1 with infrared light from an angle that facilitates detection of a crease and a fold even more.

Figure 7:
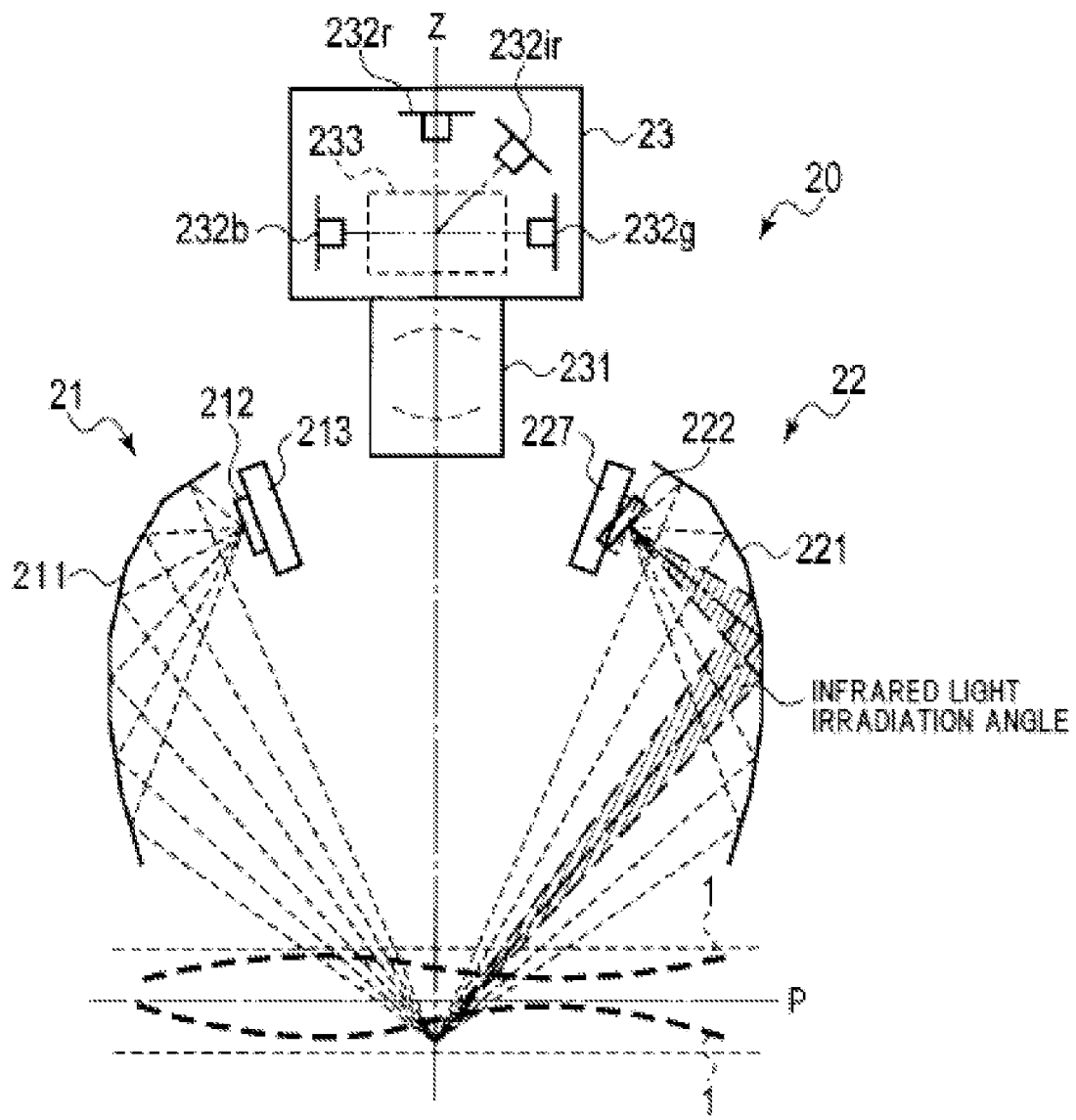
FIG. 7 is a schematic diagram for explaining an image reading apparatus according to one embodiment.

FIG. 7 shows still another example of the configuration of the image reader 20. The image reader 20 includes the illumination unit 21, the illumination unit 22, and the camera 23. It should be noted that the illumination unit 21 and the camera 23 have the same configurations as those of the example shown in FIG. 2. The illumination unit 22 includes the reflection member 221, the light sources 222, and a mounting board 227. It should be noted that the reflection member 221 has the same configuration as that of the example shown in FIG. 2.

The light sources 222 are light emitting devices that emit light. The illumination unit 22 includes the plurality of light sources 222a that emit visible light and a plurality of light sources 222c that emit infrared light. The light sources 222a may be, for example, LEDs that emit visible light. The light sources 222c may be LEDs that emit infrared light. It should be noted that the light sources 222c may be, for example, LEDs that have a higher directionality when compared with the light sources 222b or the light sources 222a. That is to say, the light sources 222c emit light at a narrower irradiation angle when compared with the light sources 222b or the light sources 222a.

With this configuration, the image reader 20 can irradiate the sheet 1 with infrared light at a narrower irradiation angle. Thus, the image reader 20 can irradiate the sheet 1 with light that is even more likely to cast a shadow in the case where the sheet 1 has a crease, a fold, or the like.

Furthermore, the light sources 222c may also be provided in such a manner that light is emitted on an optical axis different from that of the light sources 222a.

Figure 8:
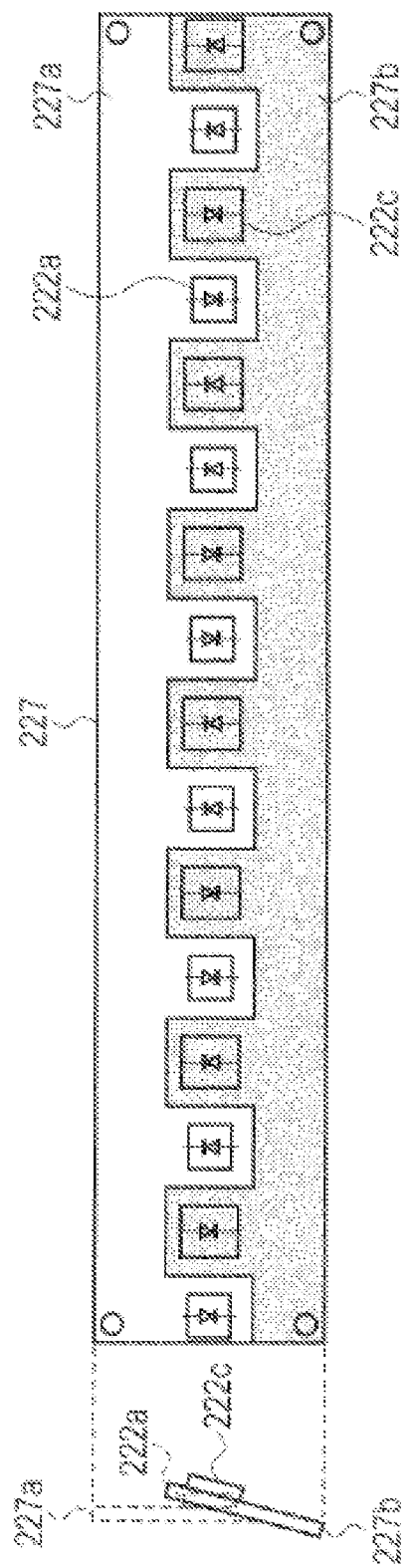
FIG. 8 is a front view for explaining an image reading apparatus according to one embodiment.

As shown in FIG. 8, the light sources 222a are provided on a first board 227a of the mounting board 227. The light sources 222c are provided on a second board 227b of the mounting board 227. It should be noted that the first board 227a and the second board 227b are provided at mutually different angles with respect to the reflection member 221 or the conveyance surface P, on which the sheet 1 is conveyed.

Thus, the light sources 222a, which are provided on the first board 227a, and the light sources 222c, which are provided on the second board 227b of the mounting board 227, can emit light on different optical axes.

With this configuration, the illumination unit 22 can control the angle of the optical axis of infrared light with respect to the sheet 1 in accordance with the installation angle of the second board 227b. Thus, the image reader 20 can irradiate the sheet 1 with infrared light from an angle that facilitates detection of a crease and a fold even more.

Moreover, in the above-described embodiment, the light sources 212 of the illumination unit 21 and the light sources 222 of the illumination unit 22 have been described as being LEDs. However, the present invention is not limited to this configuration. For example, the light sources 212 of the illumination unit 21 can be replaced with halogen lamps equipped with dichroic mirrors. The dichroic mirrors can reflect visible light and transmit infrared light. Thus, the halogen lamps equipped with the dichroic mirrors can emit visible light that does not contain infrared light in a predetermined direction.

Moreover, the light sources 222 of the illumination unit 22 can be replaced with halogen lamps equipped with aluminum mirrors. The aluminum mirrors reflect visible light and infrared light. Thus, the halogen lamps equipped with the aluminum mirrors can emit infrared light and visible light in a predetermined direction.

In this case, in order to direct light from the halogen lamps at a line-shaped irradiation range, the illumination unit 21 and the illumination unit 22 converge the light using a light guiding member provided with a diffusing surface. The light guiding member reflects the light from the halogen lamps inside and emits the light from the diffusing surface. Thus, the illumination unit 21 and the illumination unit 22 can direct light from the halogen lamps at the line-shaped irradiation range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus that reads an image of a sheet that is conveyed by a conveyance unit, the image reading apparatus comprising:
    a first illumination unit to irradiate the sheet with visible light excluding infrared light;
    a second illumination unit to irradiate the sheet with visible light and infrared light from an angle different from that of the first illumination unit;
    an imaging unit to receive visible light by a first sensor and infrared light by a second sensor reflected from the sheet and to take a visible image and an infrared image, the first sensor outputting a first signal and the second sensor outputting a second signal, the visible image being formed by the first signal from the first sensor, and the infrared image being formed by the second signal from the second sensor; and
    an identification unit to identify a crease on the sheet based on the infrared image.

2. The image reading apparatus according to claim 1, wherein
    the identification unit to also identify the sheet based on the visible image and the infrared image captured by the imaging unit and a preset parameter.

3. The image reading apparatus according to claim 2, wherein the identification unit identifies dirt on the sheet based on the visible image and identifies a fold on the sheet based on the infrared image.

4. The image reading apparatus according to claim 1, wherein the first illumination unit and the second illumination unit irradiate the sheet with visible light from both sides of an imaging optical axis of the imaging unit, and
    the second illumination unit irradiates the sheet with infrared light from one side of the imaging optical axis.

5. The image reading apparatus according to claim 1, wherein the first illumination unit directs visible light at a line-shaped irradiation range,
    the second illumination unit directs infrared light and visible light at the line-shaped irradiation range, and
    the imaging unit receives visible light and infrared light reflected from the sheet within the irradiation range and captures the visible image and the infrared image.

6. The image reading apparatus according to claim 5, wherein the second illumination unit includes:
    a light source to emit infrared light and visible light; and
    a reflection member to reflect the visible light emitted from the light source and to direct the reflected visible light at the irradiation range, and to reflect a part of the infrared light emitted from the light source and to direct the reflected part of the infrared light at the irradiation range.

7. The image reading apparatus according to claim 5, wherein the second illumination unit includes:
    a first light source to emit visible light at a first irradiation angle;
    a second light source to emit infrared light at a second irradiation angle that is narrower than the first irradiation angle; and
    a reflection member to reflect the visible light and the infrared light emitted from the first and the second light sources and to direct the reflected visible light and the infrared light at the irradiation range.

8. The image reading apparatus according to claim 1, wherein the imaging unit includes:
    a visible light sensor to image visible light and to acquire a visible image;
    an infrared light sensor to image infrared light and to acquire an infrared image; and
    a spectral member to receive light on a single optical axis, to separate the received light into visible light and infrared light, to image the separated visible light onto the visible light sensor, and to image the separated infrared light onto the infrared light sensor.

9. A sheet processing apparatus comprising:
    a conveyance unit to convey a sheet;
    a first illumination unit to irradiate the sheet with visible light excluding infrared light;
    a second illumination unit to irradiate the sheet with visible light and infrared light from an angle different from that of the first illumination unit;
    an imaging unit to receive visible light by a first sensor and infrared light by a second sensor reflected from the sheet and to take a visible image and an infrared image, the first sensor outputting a first signal and the second sensor outputting a second signal, the visible image being formed by the first signal from the first sensor, and the infrared image being formed by the second signal from the second sensor;
    an identification unit to identify a crease on the sheet based on the infrared image; and
    a sorting processor to sort the sheet based on an identification result of the identification unit.

10. The sheet processing apparatus according to claim 9, wherein the identification unit identifies dirt on the sheet based on the visible image and identifies a fold on the sheet based on the infrared image.

11. The sheet processing apparatus according to claim 9, wherein the first illumination unit and the second illumination unit irradiate the sheet with visible light from both sides of an imaging optical axis of the imaging unit, and
    the second illumination unit irradiates the sheet with infrared light from one side of the imaging optical axis.

12. The sheet processing apparatus according to claim 9, wherein the first illumination unit directs visible light at a line-shaped irradiation range, the second illumination unit directs infrared light and visible light at the line-shaped irradiation range, and the imaging unit receives visible light and infrared light reflected from the sheet within the irradiation range and captures the visible image and the infrared image.

13. The sheet processing apparatus according to claim 12, wherein the second illumination unit includes:

a light source to emit infrared light and visible light; and a reflection member to reflect the visible light emitted from the light source and to direct the reflected visible light at the irradiation range, and to reflect a part of the infrared light emitted from the light source and to direct the reflected part of the infrared light at the irradiation range.

14. The sheet processing apparatus according to claim 12, wherein the second illumination unit includes:

a first light source to emit visible light at a first irradiation angle;

a second light source to emit infrared light at a second irradiation angle that is narrower than the first irradiation angle; and a reflection member to reflect the visible light and the infrared light emitted from the first and the second light sources and to direct the reflected visible light and infrared light at the irradiation range.

15. The sheet processing apparatus according to claim 9, wherein the imaging unit includes:

a visible light sensor to image visible light and to acquire a visible image;

an infrared light sensor to image infrared light and to acquire an infrared image; and a spectral member to receive light on a single optical axis, to separate the received light into visible light and infrared light, to image the separated visible light onto the visible light sensor, and to image the separated infrared light onto the infrared light sensor.

* * * * *